April 17, 1945. L. D. RICHARD 2,374,134
GRAPPLE TO RAISE SUNKEN SHIPS, OR THE LIKE
Filed Sept. 22, 1943 6 Sheets-Sheet 1

INVENTOR.
LANCE D. RICHARD

April 17, 1945.  L. D. RICHARD  2,374,134
GRAPPLE TO RAISE SUNKEN SHIPS, OR THE LIKE
Filed Sept. 22, 1943   6 Sheets-Sheet 2
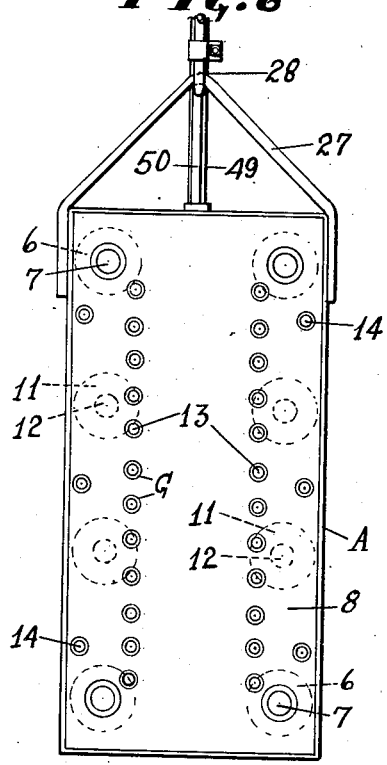
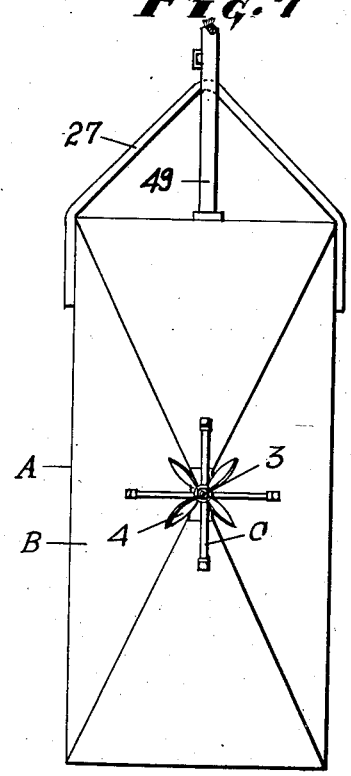
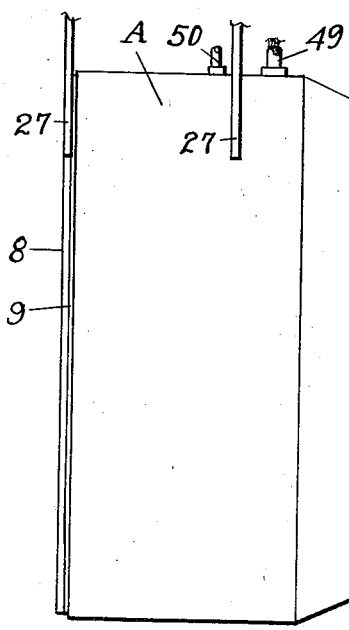
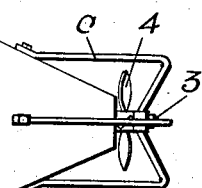
INVENTOR.
LANCE D. RICHARD April 17, 1945.　　　　　L. D. RICHARD　　　　　2,374,134
GRAPPLE TO RAISE SUNKEN SHIPS, OR THE LIKE
Filed Sept. 22, 1943　　　6 Sheets-Sheet 3
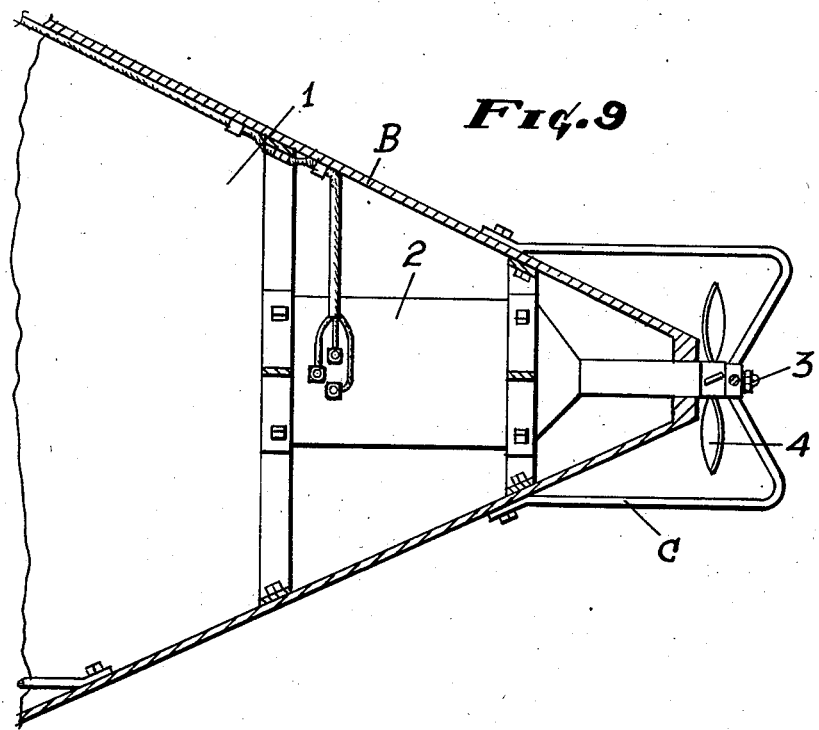
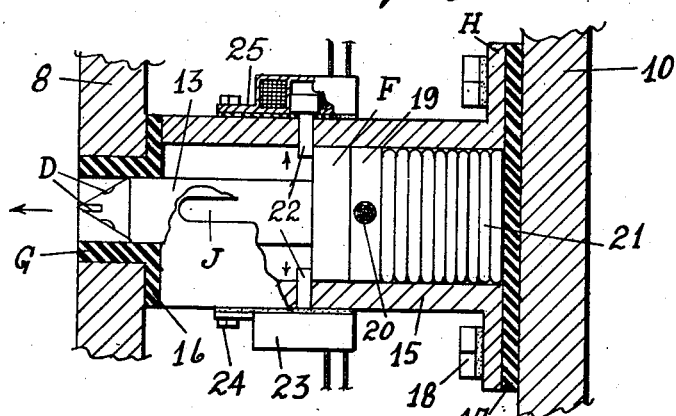
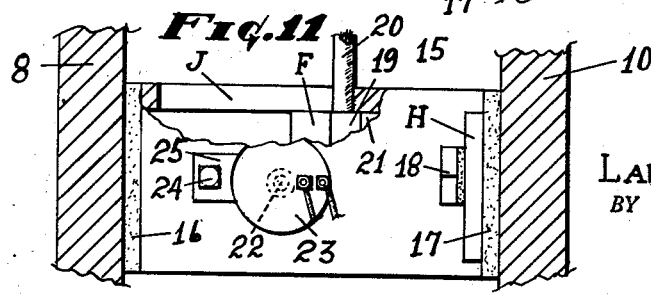
INVENTOR.
LANCE D. RICHARD
BY U. G. Charles
Atty.

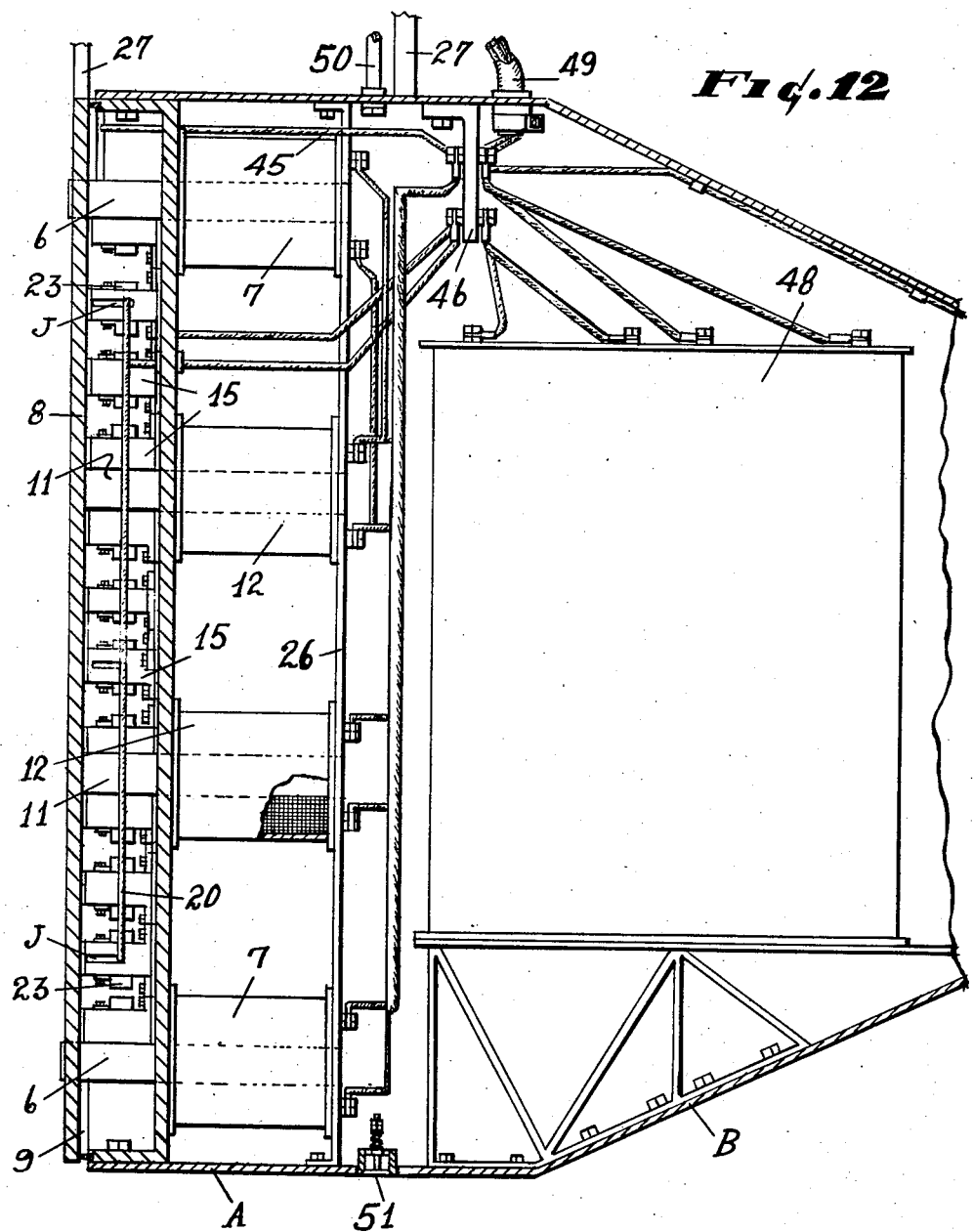

April 17, 1945.  L. D. RICHARD  2,374,134
GRAPPLE TO RAISE SUNKEN SHIPS, OR THE LIKE
Filed Sept. 22, 1943   6 Sheets-Sheet 5
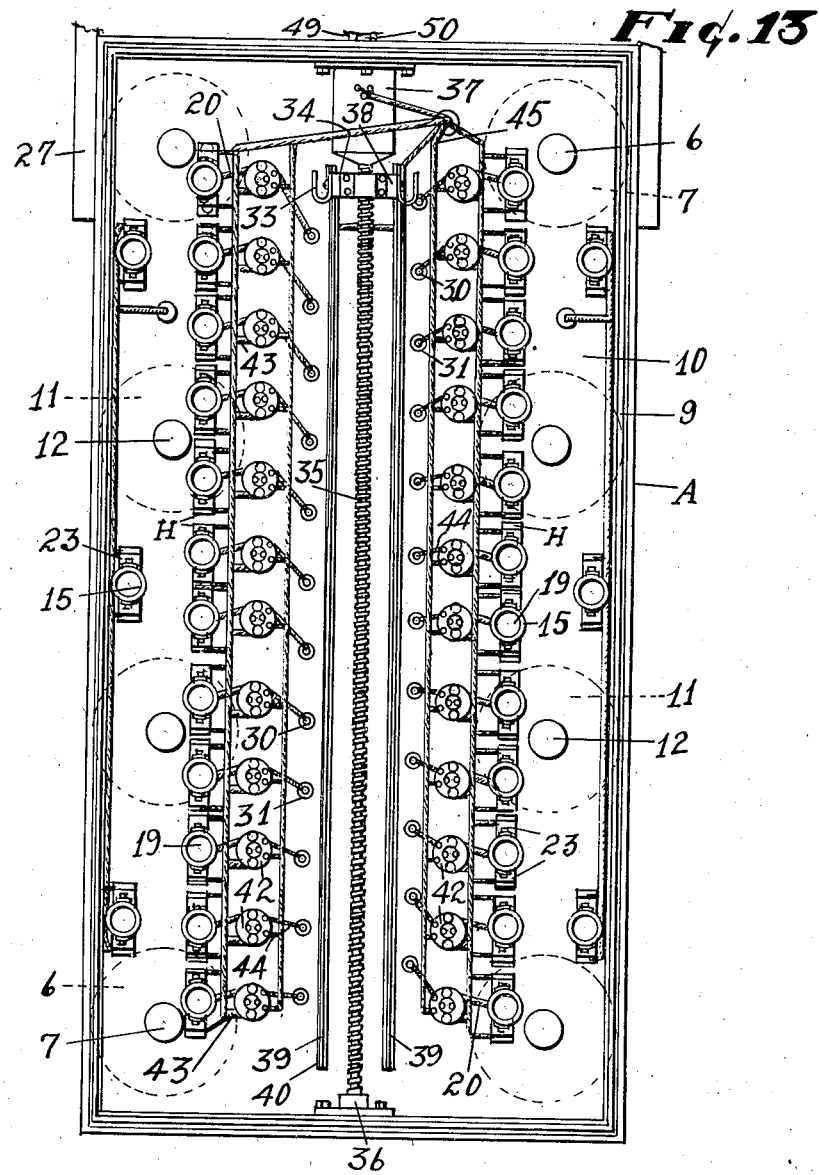
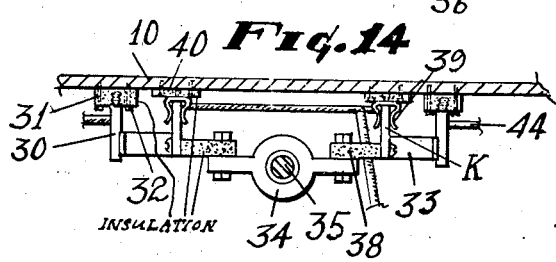
INVENTOR.
LANCE D. RICHARD

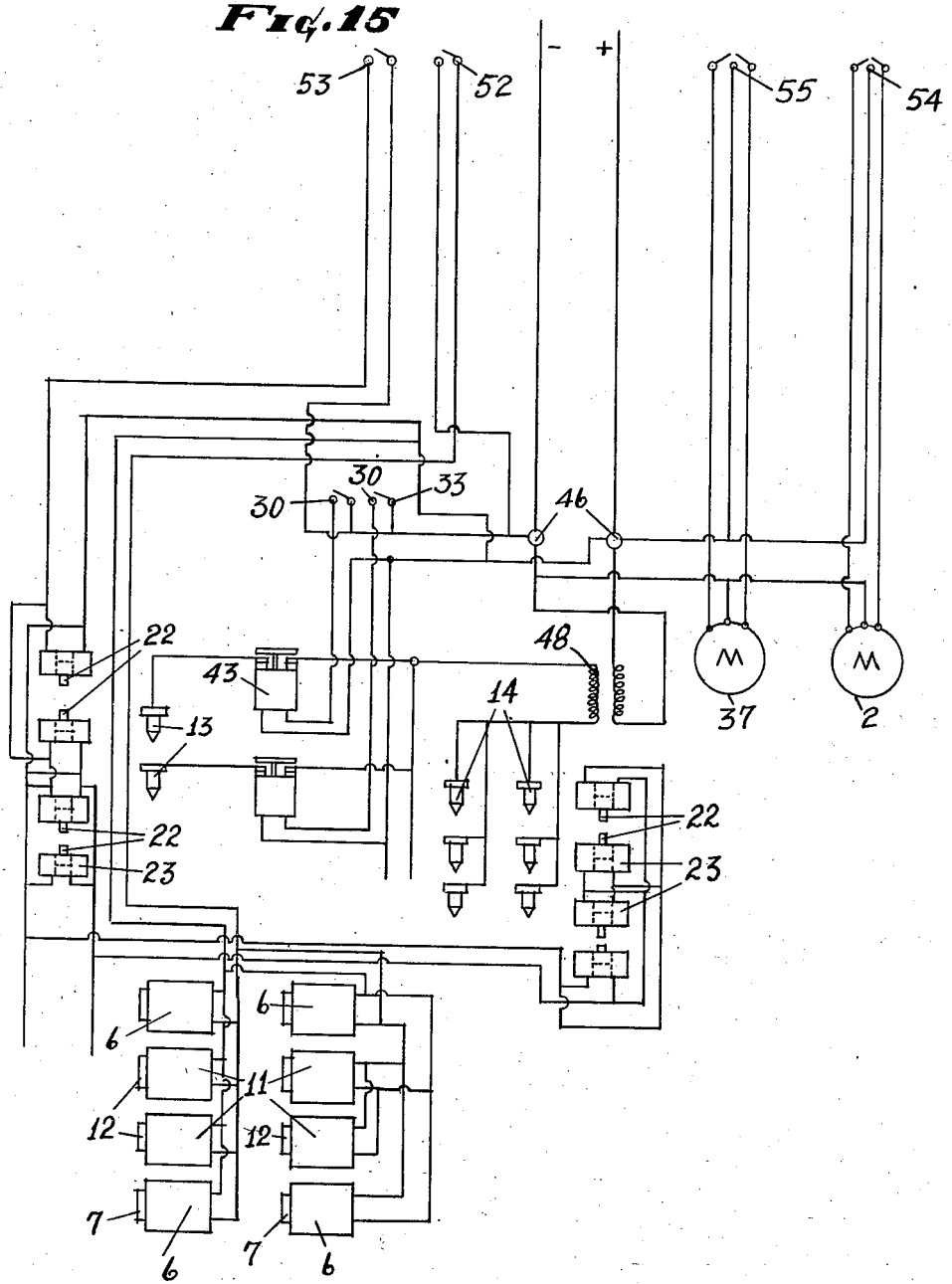

Patented Apr. 17, 1945

2,374,134

UNITED STATES PATENT OFFICE 2,374,134

GRAPPLE TO RAISE SUNKEN SHIPS OR THE LIKE

Lance D. Richard, Wichita, Kans.

Application September 22, 1943, Serial No. 503,438

2 Claims. (Cl. 114—51)

This invention relates to a grapple to raise sunken ships or the like, and has for its principal object the method of securing hoisting grapples by electrically welding the same to a metallic portion of the ship.

A further object of this invention is to provide an efficient magnetic means or otherwise propelled to clamp the grapple firmly to its welding point prior to or at the time of energizing the electric current to the consistency of a welding heat.

A still further object of this invention is to pendently carry the grapple by an efficient steel cable to be wound on a hoisting drum journalled on a ship float at the surface of the water in working relation to the sunken ship, the cables and ships afloat being in sufficient number to hoist and convey the wrecked ship to a convenient dock for repair or wreckage purpose.

These and other objects will hereinafter be more fully described, reference being had to the accompanying drawings forming a part of this specification, wherein like characters apply to like parts in the different views.

Referring to the drawings:

Fig. 6 is a front view of the welding machine to show the position of the electrodes and magnets.

Fig. 7 is a rear view of Fig. 6 to illustrate the position of the propeller.

Fig. 8 is a side view of said Figs. 6 and 7.

Fig. 9 is an enlarged sectional view through the rear portion of the casing to illustrate the position of the propeller and its motor.

Fig. 10 is a sectional view to illustrate the arrangement for one of the electrodes consisting of its plunging spring and releasable detents to control the moment of plunge of the electrode.

Fig. 11 is a plan view of Fig. 10.

Fig. 12 is a vertical sectional view through the front portion of the machine, parts removed for convenience of illustration.

Fig. 13 is a view of the machine rearward of its grapple plate to show the traveling circuit closer for the two rows of electrodes that are spaced apart, the electrode being in spaced relation along said rows, the circuit closer arranged to energize the electrodes one at a time alternately from row to row.

Fig. 14 is an enlarged fragmentary upper end view of the circuit closer and support for the rows of electrodes.

Fig. 15 is a wiring diagram for the electric system.

Figure 1:
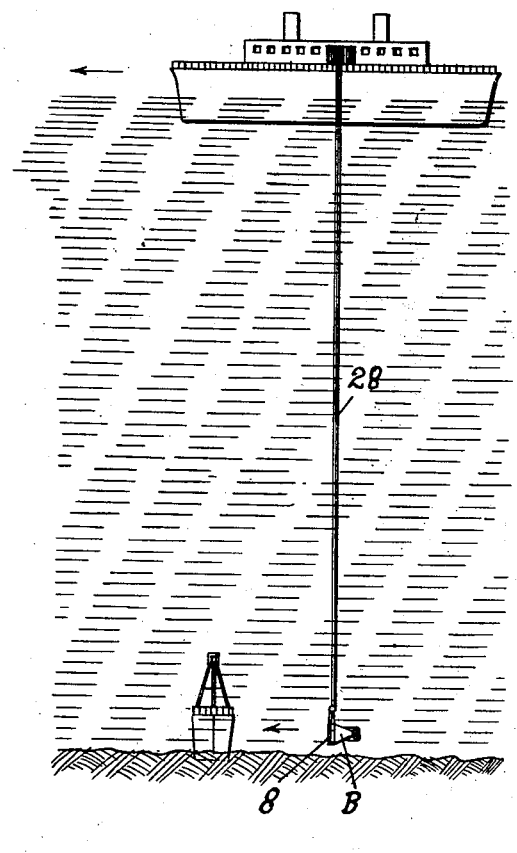
Fig. 1 is an illustrative view showing a ship afloat and a sunken ship to which the grapples are to be welded.
Figure 2:
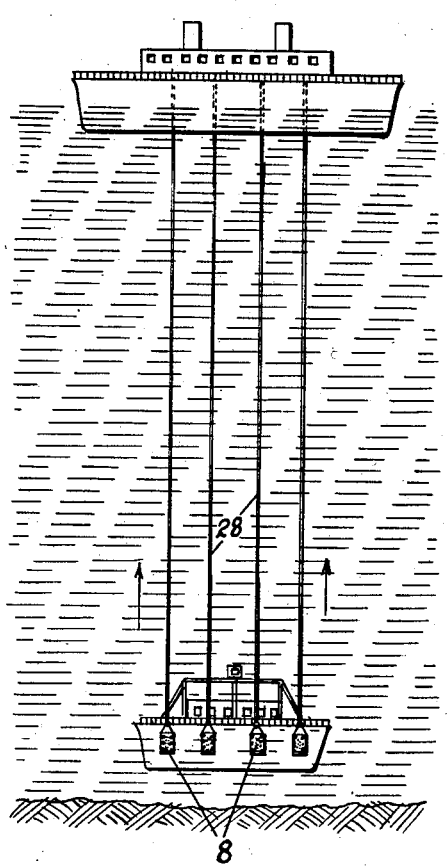
Fig. 2 is another view to illustrate that a plurality of grapples may be applied to the sunken ship, said ship being on its way upward.
Figure 3:
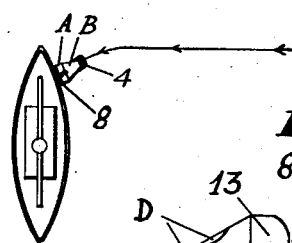
Fig. 3 is a plan view illustrating a line of travel that may be required for the grapple to reach the hull of a ship.
Figure 4:
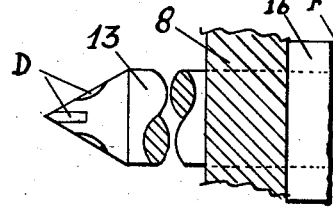
Fig. 4 is an enlarged fragmentary side view of an electrode projecting through the grapple plate that is sectionally illustrated.
Figure 5:
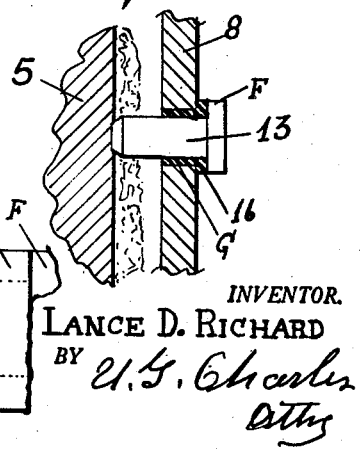
Fig. 5 is a similar view to that of Fig. 4 to illustrate the electrode penetrating the armored shell of a ship that is likewise sectionally illustrated.

As a more concise description of the drawings, it will be seen that a casing is provided having rectangular and pyramidal portions A and B respectively, the rectangular portion A having installed therein an electrical distributor, magnets and penetrating electrodes, later described.

The pyramidal portion B provides an air chamber 1 and a motor 2, the shaft 3 of which extends outward at the apex of the pyramidal portion, and having secured on the outer end thereof a propeller 4 that is guarded by a frame C, said propeller being conveying means for the welding machine toward a metallic shell 5 of a sunken ship, the machine being headed thereward by directional magnets 6 that are positioned in the said rectangular portion of the casing in such a way that the cores 7 of said magnets extend through a metallic plate 8 to bind firmly the machine in close contact with the hull of the ship. Said plate 8 functions as an inclosure for the outer end of the rectangular portion of the casing and is watertight through the medium of a rubber gasket 9, dovetailed in a groove extending around the outer edge of the end and side walls of plate 10, and said plate also functioning as carrying means for the electrodes.

It will also be seen that the other magnets 11 are likewise carried in the said rectangular portion, the cores 12 of said magnets contacting the inner side of plate 8 to retain said plate in working relation to the machine.

There are provided two rows of pointed electrodes 13 spaced apart and being intermediately positioned and adapted to extend through plate 8, said electrodes being in spaced relation along said rows, and being one side of an electric circuit. Outward from said rows are other similar electrodes 14, there being three electrodes in this instance spaced along each side of the plate 8, last said electrodes to function as grounds for the first said electrodes.

Each electrode is preferably pointed to penetrate barnacles or other accumulation on the surface of the armored hull of the ship; furthermore, being pointed, will intensify the welding contact.

There is also provided a flux material D positioned in depressions along the pointed tip of each electrode to assist in the welding. The other end of the electrode has a flat sided circular head F that slidably engages in a sleeve 15 with a smooth running fit and each sleeve being positioned between the plates 8 and 10 longitudinally of the sleeves, and being separated therefrom by insulation 16 and 17 at their respective ends of the sleeves. The insulation at one end of each sleeve has a nipple G as a lining for its aperture passing through plate 8 and through which the electrode slidably engages water tight.

It will be seen that the sleeves are secured to plate 10 by cap screws 18 passing through ears H oppositely disposed on one end of the sleeves and threadedly engaging in said plate 10. Positioned on the head of the electrode is a disc-like electric transmitter 19 for current to the electrode through the medium of a conductor wire 20 connected to said transmitter and outwardly extending from its periphery and slidably through a slot J in the sleeve, the movement being actuated by a coil spring 21 when said sleeve is released by its detents oppositely disposed, consisting of cores 22 that are actuated by their respective solenoid body portions 23 that are secured to the sleeve by cap screws 24 engaging through their respective ears 25 and threadedly engaging into the sleeve. The said sleeve is apertured through which the cores will slidably engage so that the terminal ends thereof will engage with the inner side or the circular head as shown in Fig. 10, and when said cores are retracted outward by the windings of the solenoid the electrode is free to be forced to engagement with a metallic body to which it is welded as above stated.

As to the arrangement of the electrodes, solenoids and magnets, it will be seen that the electrodes and solenoids are positioned between plates 8 and 10, while the windings of the magnets are secured between plate 10 and a bar 26, said plate 10 and bar 26 being rigidly secured to the rectangular portion of the casing. Upon completion of welding the electrodes to the armored plate of a ship, said magnets are de-energized for the removal of said plate 10 carrying its components except plate 8 and all of the electrodes that extend through plate 8 that function as one grapple among other like plates as raising means for the sunken ship through the medium of their bales 27 to which cables 28 are attached and to winding drums operatively carried by the ship or ships afloat thereabove (said winding drums not shown in the drawings).

Upon completion of the welding as above stated, plate 8 is detached by disengagement of the magnets and by action of springs 21 and propeller 4, at which time the machine except plate 8 may be raised by its cable 28 for repeated engagement with other plates and their electrodes.

The electrical distributor above referred to is carried by plate 10 and consists of the electrode sleeves heretofore referred to and their respective electric contact posts 30 seated in insulation blocks 31 that are secured to said plate 10 in staggered relation by cap screws 32 whereby an electric current is conducted to the electrodes one at a time alternately from one row to the other as closed by brush elements 33, said brush elements being oppositely disposed and carried by a traveling head 34 that is conveyed by a threaded shaft 35, one end of which is journalled in a bearing 36 secured to the lower end wall of plate 10, the other end being connected to an electric motor 37 that is secured to the other end wall of said plate 10. Each brush at its upper end is connected to its respective side of the head by insulation blocks 38 and extending upward therefrom a short distance to prolong its contact with posts 30 to insure penetration of the pointed electrodes and welding thereof to the armored plates. A lower end of said brush elements slidably engages between the legs of electric tracks 39 that are secured to the plate 10 and being separated therefrom by insulation strips 40, said tracks extending from one end to the other of said threaded shaft, whereby continuous closing of the electric circuit is maintained as the head is conveyed to energize the electrodes alternately along the rows thereof and one at a time.

As a means to avoid arcing at the brush contacts, there is provided a relay 42 for each positive electrode and being connected thereto by conductors 43, the moving portion of the relay being operated by conductors 44 connecting to the posts 30 and to a feed line 45 that branches from a junction box 46 secured to the upper wall of the casing. Positioned in the casing is a transformer 48 to increase the current for welding the electrodes to the armored plate of the sunken ship, the wires for the source of current extending upward through a waterproofed covering 49 and to the ship above where the source of current is produced and controlled.

To maintain a predetermined pressure in the casing and to avoid collapsing thereof in great depth of water, there is provided an air conductor 50 communicating into the hollow of the casing, said source for producing the air not shown in the drawings but required to be placed on the surface ship, and should the casing become excessively charged with air, there is provided an exhaust valve 51 to move outward from the wall of the casing, making an opening for the air to escape.

A summary of the operation in consecutive order is as follows. The machine will be conveyed by the surface ship and by the propeller 4 on the machine, during which time a switch 52 on the surface ship will be closed to energize the magnets for retaining plate 8 to the machine and to firmly bind the machine to the hull of a sunken ship when in contact therewith. At the completion of this action, a switch 53 near switch 52 will be closed to energize the solenoids 23 releasing the electrodes for a contact with the armored plate of the sunken ship, which completes the circuit between electrodes 13 and 14 when the relay 43 is energized by action of brush 33 contacting post 30. When the welding has been completed for all of the electrodes, switch 52 is opened to de-energize the magnets, releasing plate 8 from the welding machine, and at which time a switch 54 for the propeller will be closed to assist the springs 21 in moving the machine from the plate 8 for its final operation.

The machine will then be moved upward for operations on similar plates, while the sunken ship will be raised by the plates 8 through the medium of its respective cables attached to the plates 8.

In the wiring diagram it will be seen that the motors 2 and 37 are of the reversible type, the switch 54 being provided for propeller motor 2, while a switch 55 is provided for distributor motor 37. In the wiring diagram, all of the ground electrodes have been shown while only a portion of the positive electrodes, relays, and solenoids have been illustrated.

Such modifications may be made as lie within the scope of the appended claims.

Having fully described this invention what is claimed as new and desired to secure by Letters Patent is:

1. In a grapple to salvage sunken ships, the grapple being a machine comprising a casing having rectangular and pyramidal portions integrally joined, said rectangular portion comprising a removable forwardly positioned plate and a rearwardly positioned plate, said plates being spaced apart in parallelism, there being an electric motor positioned in the pyramidal portion of the casing and a propeller driven by the motor, a traveling electric circuit closer positioned in the rectangular portion of the casing, and sleeves of a suitable length and diameter longitudinally positioned within said rectangular portion and being carried by the last said plate, said traveling circuit closer being mounted on said last named plate and consisting of a threaded shaft and a head threadedly engaging on said threaded shaft, and two rows of contact posts between which the threaded shaft is journalled and being in parallelism with the said rows of posts, said head having sliding contact elements to engage the posts one at a time alternately from row to row as the head is conveyed therealong, a relay for each post, each post having an electrode and wiring means to connect the same, and a source of electric power being connected to the sliding contact elements, and two sets of magnets carried by last said plate, one set of said magnets securing said plates together magnetically, the other set coacting with the propeller to direct the machine toward and in contact with a sunken ship to weld the grapple thereto.

2. In a grapple of the class described in combination, a machine comprising a pyramidal portion and a rectangular portion integrally joined, a removable plate for one side of the rectangular portion, and another plate in spaced relation rearward from first said plate in parallelism therewith, the pyramidal portion having a motor positioned therein as a power medium for a propeller positioned outward at the apex of the pyramidal portion, two series of relays positioned on the rear plate, the series spaced apart and electric contact posts for the series of relays, the posts being positioned in staggered relation along their respective series of relays and aligned in parallelism therewith, a threaded shaft and means to journal the shaft in the rectangular portion and being between said aligned posts, a head threadedly engaging on the shaft, the head being a circuit closer as it contacts the posts alternately, there being a row of electrodes for each series of relays to weld the electrodes one at a time in alternate relation to a metallic hull of a ship, and the removable plate being apertured and through which the electrodes will extend as actuated by a spring for each thereof and means to release the electrodes when energized by an electrical current.

LANCE D. RICHARD.